United States Patent
Haslinger

(10) Patent No.: US 8,781,265 B2
(45) Date of Patent: Jul. 15, 2014

(54) SENSOR, A SYSTEM AND A METHOD FOR MEASURING FORCES AND/OR MOMENTS

(75) Inventor: Robert Haslinger, Groebenzell (DE)

(73) Assignee: Deutsches Zentrum fur Luft-und Raumfahrt E.V., Cologne (DE)

( * ) Notice: Subject to any disclaimer, the term of this patent is extended or adjusted under 35 U.S.C. 154(b) by 279 days.

(21) Appl. No.: 13/306,341

(22) Filed: Nov. 29, 2011

(65) Prior Publication Data

US 2012/0134621 A1 May 31, 2012

(30) Foreign Application Priority Data

Nov. 29, 2010 (DE) .......................... 10 2010 052 614

(51) Int. Cl.
*G02B 6/00* (2006.01)

(52) U.S. Cl.
USPC .............................................. 385/12; 385/37

(58) Field of Classification Search
CPC .............. G01D 5/353; G01D 5/35303; G01D 5/35316; G01N 21/7703; G01B 1/00; G01B 11/18; G01L 1/26; G01L 1/246
USPC ................................................ 385/12, 13, 37
See application file for complete search history.

(56) References Cited

U.S. PATENT DOCUMENTS

| | | | |
|---|---|---|---|
| 4,755,667 A * | 7/1988 | Marsoner et al. | 250/227.24 |
| 5,280,172 A * | 1/1994 | Di Bin et al. | 250/227.21 |
| 6,009,222 A * | 12/1999 | Dong et al. | 385/127 |
| 6,312,961 B1 * | 11/2001 | Voirin et al. | 436/518 |
| 6,366,722 B1 * | 4/2002 | Murphy et al. | 385/37 |
| 7,228,017 B2 * | 6/2007 | Xia et al. | 385/12 |
| 7,473,906 B2 * | 1/2009 | Egalon | 250/458.1 |
| 7,499,605 B1 * | 3/2009 | Xia et al. | 385/12 |
| 2005/0163424 A1 * | 7/2005 | Chen | 385/37 |

FOREIGN PATENT DOCUMENTS

| | | |
|---|---|---|
| DE | 199 62 668 C1 | 12/2000 |
| DE | 696 10 129 T2 | 5/2001 |
| DE | 100 11 790 A1 | 10/2001 |

OTHER PUBLICATIONS

DE 10 2010 052 614.2 German Search Report dated Jun. 30, 2011.

* cited by examiner

*Primary Examiner* — Daniel Petkovsek
(74) *Attorney, Agent, or Firm* — Maier & Maier, PLLC

(57) ABSTRACT

A sensor for measuring forces and/or moments on an object, including at least one sensor element for the detection of an expansion of the object in at least one spatial direction, from which expansion a force or a moment can be determined, wherein the sensor element including an optical fiber with a sensor region with a fiber Bragg grating is provided, and the fiber Bragg grating is adapted to be irradiated with light, preferably a broadband light, generating a reflected light having a peak wavelength. The optical fiber is formed by a fiber core and at least one sheath of light-guiding material surrounding the fiber core. The fiber Bragg grating is arranged in the fiber core. The material of the sheath is doped with a fluorescent material and the fluorescent material may be irradiated with an excitation radiation to generate a fluorescent radiation having at least one main emission wavelength.

11 Claims, 1 Drawing Sheet

SENSOR, A SYSTEM AND A METHOD FOR MEASURING FORCES AND/OR MOMENTS

RELATED APPLICATIONS

This application claims the benefit of priority under 35 U.S.C. §119 to German Patent Application No. 10 2010 052 614.2 filed on Nov. 29, 2010, the disclosure of which is incorporated by reference herein its entirety.

BACKGROUND OF THE INVENTION

1. Field of the Invention

The present invention refers to a sensor for measuring forces and/or moments, to a method for measuring forces and/or moments, as well as to a system for measuring forces and/or moments on an object, for example on a device for minimally invasive surgery.

2. Description of the Prior Art

It is known, for example, to use fiber Bragg gratings (FBG) with sensors for measuring forces and/or moments. Here, the degree of expansion of the fiber Bragg grating, and thus the degree of expansion of the object on which the sensor is arranged, is determined from the light reflected by the fiber Bragg grating. The degree of expansion can then be used to determine a force and/or a moment acting on the object.

With such measurements, however, the measuring result strongly depends on temperature, since the object, and thus the fiber Bragg grating, expands in dependence on temperature and as a function of the force or the moment acting, and also the reflection behavior of the fiber Bragg grating changes due to the thermo-optical coefficients of the fiber in which the fiber Bragg grating is provided. The measured wavelength of the fiber Bragg grating is not suited for an ex post determination of which proportion results from temperature variation and which proportion results from variation by expansion.

According to a known possibility for compensation, a sensor is used to measure the temperature at a point of the object, e.g. by means of another fiber Bragg grating, and to mathematically compensate for the temperature variation proportion of the sensor signal. However, this requires that the additional fiber Bragg grating is arranged in a manner isolated against expansion. It is another drawback of this invention that it supposes a uniform temperature across the entire sensor body. If, for example, such a sensor is used on a minimally invasive surgical instrument, one cannot assume a defined temperature of the entire sensor since, for example, flushing solutions or contact with organs may lead to an inhomogeneous temperature distribution across the instrument. On the other hand, using a plurality of measuring points for temperature measurement is often impractical or impossible for reasons of space; further, it is also possible that the entire sensor characteristic is changed by additional temperature sensors.

The applicant has developed a sensor for measuring forces and/or moments, wherein a fiber Bragg grating is provided in a single-mode fiber. Moreover, the material of the single-mode fiber is doped with a fluorescent material. The fiber Bragg grating is illuminated with broadband light and the peak wavelength of the reflected light is detected. The main emission wavelength of the fluorescent radiation differs from the wavelength range of the peak wavelength of the reflected light of the fiber Bragg grating. It is thus possible to determine the expansion of the object, without temperature influences, from the fluorescence lifetime of the fluorescent radiation and the peak wavelength of the reflected light of the fiber Bragg grating.

However, such sensors must have a certain length since the number of atoms excited to fluorescence is limited due to the very small diameter of the single-mode fiber core and therefore only very little fluorescent radiation is reflected. The amount of light of the fluorescent radiation can be so small that the signal-to-noise ratio does not allow for a sufficiently accurate compensation. Often, the marginal conditions do not allow for an elongation of the measuring site and thus for an enlarging of the region in which the fluorescent material is provided. On the other hand, a heavier doping of the glass fiber material is often impossible as well, since the properties of the glass mixture could be modified by the doping and, in addition thereto, the doping atoms in some fluorescent doping materials influence each other strongly when the concentration is high, whereby the measurement could be compromised.

SUMMARY OF THE INVENTION

It is an object of the invention to provide a sensor, a method and a system for measuring forces and/or moments on an object, wherein temperature influences are at least largely compensated for, the sensor requiring only very little space, in particular with respect to its length.

The object is achieved with the features of claims 1, 8 and 11.

In a sensor for measuring forces and/or moments on an object with at least one sensor element for detecting an expansion of the object in at least one spatial direction, from which expansion a force or a moment can be determined, and wherein the sensor element comprises an optical fiber with a sensor region in which a fiber Bragg grating is provided and the fiber Bragg grating is adapted to be illuminated with light, preferably broadband light, to generate reflected light with a peak wavelength, it is provided according to the invention that the optical fiber is formed by a fiber core and at least one sheath of light-guiding material enclosing the fiber core, and that the fiber Bragg grating is provided in the fiber core, whereby the material of the sheath being doped with a fluorescent material and the fluorescent material can be irradiated with an excitation radiation to generate fluorescent radiation with at least one main emission wavelength.

Such a sensor is advantageous in that the volume of the sheath material enclosing the fiber core is substantially larger than that of the fiber core having the same length so that the quantity of fluorescent material is much larger compared to a single-mode fiber of the same length. The amount of light of the fluorescent radiation generated by the sensor element of the invention is thus mostly sufficient to reduce signal noise and to allow a very precise measurement. In such a sensor element, the excitation radiation used to generate the fluorescent radiation can be obtained by means of laser diodes whose radiation is emitted from multi-mode fibers. Compared to laser diodes coupled to single-mode fibers, such laser diodes have a clearly higher output power in the fiber, whereby the measuring signal is stronger. Moreover, laser diodes whose radiation is emitted from a multi-mode fiber are clearly more economic to procure than laser diodes coupled to single-mode fibers.

The expansion of the fiber Bragg grating or the object on which the sensor and thus the fiber Bragg grating is arranged can be determined from the peak wavelength of the light reflected from the fiber Bragg grating, the expansion being composed of an expansion component caused by the force acting on the object or the moment acting on the object, respectively, and an expansion component caused by the temperature of the object. Further, the temperature also influences the thermo-optical coefficient of the fiber core and thus the peak wavelength of the reflected light.

The main emission wavelength of the fluorescent radiation of the fluorescent material allows to determine, for example from the fluorescence lifetime, a signal that depends on the expansion and the temperature of the optical fiber and thus of the object. By providing two measuring methods whose results include both the expansion of the object and the temperature of the object, an expansion of the object can be calculated for which the temperature influences are compensated. Thus, it is possible to determine the expansion of the object that is caused exclusively by the influence of forces and/or moments on the object.

The sensor of the invention makes this method possible, since it allows to generate both the peak wavelength of the light reflected from the fiber Bragg grating and a measurable fluorescent radiation having a main emission wavelength. Yet, the sensor is of a very compact design, since the fluorescent material is provided in the optical fiber in whose fiber core the fiber Bragg grating is arranged. The space required by the sensor in the longitudinal direction therefore not exceed the space required by a conventional sensor using fiber Bragg gratings, while still allowing for a temperature compensation of the measurement data. Further, the sensor length can be short because the sheath provides sufficient volume for the fluorescent material.

Accordingly, the sensor of the invention is also suitable for very short measuring points.

The at least one sheath can be surrounded by another sheath of light-guiding material or another coating, whereby it can be guaranteed that the radiation introduced into the sheath remains in the sheath or is passed through the same.

According to a first embodiment of the invention the material of the fiber core is doped with a fluorescent material, preferably with the same fluorescent material as the sheath, which fluorescent material of the fiber core has an excitation radiation and a fluorescent radiation with main emission wavelengths in wavelength ranges that are different from the wavelength range of the peak wavelength of the light reflected from the fiber Bragg grating.

The additional doping of the fiber core allows for an increase in the volume of the optical fiber region doped with fluorescent material, so that the signal quality of the fluorescent radiation is improved. By providing a fluorescent material in the fiber core whose excitation radiation and fluorescent radiation have main emission wavelengths in wavelength ranges that differ from the wavelength range of the peak wavelength of the light reflected from the fiber Bragg grating, it is possible to guarantee that the different signals of the fiber Bragg grating and of the fluorescent material can be clearly discriminated.

The fluorescent material may, for instance, be a rare earth metal, preferably ytterbium and/or erbium. This material has proven its particular usefulness in tests. For example, ytterbium can be excited to fluorescence at a wavelength of 980 nm and the main emission wavelength of the fluorescent radiation is in a range about 1040 nm. Thus, this material can be used to dope the fiber core if a fiber Bragg grating is used that has peak wavelengths in the range between 1520 nm and 1560 nm.

Accordingly, the wavelength range of the excitation radiation can thus be in the range around 980 nm and the wavelength range of the main emission wavelength can be about 1040 nm.

It should be understood that other fluorescent materials such as chromium could be used as well.

According to an embodiment of the invention, the fiber core has polarization-maintaining properties and each sensor element detects the expansion of the object in two spatial directions, with the expansion of the object in two spatial directions being detectable via the fast axis of the polarization-maintaining fiber-core and the slow axis of the polarization-maintaining fiber core. In this manner, the sensor of the invention can be kept particularly small, since two expansion values can be obtained through one sensor element. In a sensor that is adapted, for instance, to detect six expansions of the object for a determination of forces and moments in three spatial directions, respectively, it is possible to provide only three sensor elements. If course, it is also possible to provide a plurality of sensor elements for a determination of the expansions. This allows for a sensor of particularly small dimensions.

In this context it may be provided that the fiber core is a birefringent fiber. Such a fiber advantageously allows to maintain the polarization of the incoming light.

In a sensor having a plurality of sensor elements it is advantageously provided that the sensor regions of each sensor element are doped with a fluorescent material that is different from the fluorescent material of the other sensor elements. Thereby, it becomes possible to advantageously obtain measured values for each individual sensor element from the fluorescent radiation, since different main emission wavelengths of the fluorescent radiation exist due to the different fluorescent materials, thus allowing for a good discrimination thereof and making it possible to associate them to individual sensor elements.

It should be understood that the sensor regions of a plurality of sensor elements could also be doped with the same fluorescent material.

According to the invention it may be provided that the fluorescent material of each sensor element of a sensor of the invention has an excitation radiation and a fluorescent radiation with main emission wavelengths in wavelength ranges that differ from the wavelength range of the peak wavelengths of the light reflected from any of the fiber Bragg gratings. Thereby, the signal of the fluorescent radiation can advantageously be discriminated from the signals of the fiber Bragg gratings.

According to one embodiment of the invention, the fiber core has a diameter between 4 and 11 μm and the sheath enclosing the fiber core has a diameter between 80 and 125 μm, preferably 105 μm. Such dimensions of the optical fiber have proven particularly advantageous. The sensor provided with such an optical fiber may be of a very small design, with the fiber core diameter of between 4 and 11 μm allowing the provision of a fiber Bragg grating therein. The sheath, whose diameter is between 80 and 125 μm, has a volume that can receive a sufficient amount of doting material to guarantee the function as provided by the invention.

The invention further provides a method for measuring forces and/or moments on an object, wherein an expansion of the object is determined by means of an optical fiber with a fiber Bragg grating and the forces and/or moments are determined from the expansion of the object, the fiber Bragg grating being illuminated with light, preferably a broadband light, and a peak wavelength of the reflected light being detected. The optical fiber is formed by a fiber core and a sheath of light-guiding material surrounding the fiber core. The fiber Bragg grating is provided in the core and the material of the sheath is doped with fluorescent material. The fluorescent material is irradiated with an excitation radiation to generate a fluorescent radiation of the fluorescent material. At least one main emission wavelength of the fluorescent radiation is detected, it being preferred to determine the florescence lifetime of the fluorescent radiation. The expansion of an object is determined without the temperature influences through the detection of the at least one main emission wavelength of the fluorescent radiation and the peak wavelength of the reflected light.

Such a method is advantageous in that the expansion of the object is measured by two different methods so that the temperature influences on the measurement and on the expansion of the object can be compensated for. This allows for a very accurate measurement of the expansion of the object and thus of the forces and/or moments acting on the object.

According to the method of the invention it may be provided that the excitation radiation is fed to the sheath via a multi-mode fiber and/or that the broadband light is fed to the fiber core via a single-mode fiber. Feeding the excitation radiation for the fluorescent material into the sheath through a multi-mode fiber has the advantage that laser diodes could be used that have a substantially higher output power than laser diodes that are merely coupled to a single-mode fiber. In addition, laser diodes emitting radiation from a multi-mode fiber are clearly more economic to procure than laser diodes coupled with single-mode fibers. Due to the higher output power of the laser diode, the intensity of the signal formed by the fluorescent radiation can be improved so that the method of the invention can achieve a sufficient signal strength of the fluorescent radiation.

It may be provided in the method of the invention that the excitation radiation and the main emission wavelengths of the fluorescent radiation of the fluorescent material are in wavelength ranges that differ from the wavelength range of the peak wavelength of the light reflected from the fiber Bragg grating. Thereby, it is avoided that the main wavelengths of the excitation radiation and of the fluorescent radiation and the peak wavelength of the reflected light overlap, so that the signals are clearly distinct and do not interfere with each other.

The method of the present invention provides in particular that a sensor of the present invention is used.

The method advantageously provides that the expansion of the object is determined at several measuring points on the object through a plurality of fiber Bragg gratings, wherein the temperature influences are compensated for, preferably for each measuring point, through the detection of at least one main emission wavelength of the fluorescent radiation, preferably through a determination of the fluorescence lifetime.

Since the object can have different temperatures at the different measuring points, the method of the present invention allows a separate compensation of the temperature influences for each measuring point, so that a particularly accurate measurement is possible.

It may be provided that the intensity of the excitation radiation is periodically modulated and the fluorescence lifetime is determined from the phase shift between the excitation radiation and the main emission wavelength of the fluorescent radiation. The fluorescence lifetime can be determined in a particularly advantageous manner from the phase shift.

It is further possible that the fluorescent material emits light at different wavelengths so that a plurality of main emission wavelengths exists. The evaluation of the measured values through the fluorescent radiation may then also be effected through the ratio of the intensities of the main emission wavelengths.

According to the method of the invention the frequency of the frequency of the detection of the peak wavelength of the light reflected from the fiber Bragg grating is higher than the frequency of the detection of the main emission wavelength of the fluorescent radiation. Since the fluorescent radiation is used mainly to determine the temperature of the sensor or the object, and the changes in expansion are much faster than the changes in the temperature of the object, it is sufficient to detect the main emission wavelength of the fluorescent radiation with a lower sampling rate than used in the detection of the peak wavelength of the reflected light.

The invention further provides a system for measuring the forces and/or moments on an object, the system comprising at least one sensor having at least one fiber Bragg grating, a first light source for the generation of light, preferably a broadband light, connected to the at least one sensor for the illumination of the at least one fiber Bragg grating, and a first detector, preferably a spectrometer, for the detection of the reflected light generated by the fiber Bragg grating and for the determination of a peak wavelength of the reflected light. According to the invention it is provided that at least one sensor is a sensor of the present invention and that a second light source for the generation of the excitation wavelength of the fluorescent material of one or a plurality of sensor elements and a second detector for the detection of the fluorescent radiation of the fluorescent material and for the determination of at least one main emission wavelength of the fluorescent radiation are connected to the at least one sensor.

The system of the invention allows for an advantageous measuring of forces and/or moments on an object by using the sensor of the invention to evaluate the signal from the light reflected from the fiber Bragg grating and the signal from the fluorescent radiation of the fluorescent material, whereby an expansion is determined for which the temperature influences are compensated. In this way, forces and/or moments acting on the object can be determined in an advantageous and a very precise manner.

With the sensor of the present invention, the method of the present invention and the system of the present invention it is advantageous or in some respect necessary to calibrate the sensor.

In a system according to the present invention it may be provided that one respective single-mode fiber connects the first light source to the fiber core of each sensor element and/or that a multi-mode fiber connects the second light source to the sheath of each sensor element of the sensor. By providing a multi-mode fiber connecting the second light source to the sheath of each sensor element of the sensor, the light source can be designed as a laser diode adapted to be coupled with a multi-mode fiber. Such laser diodes may have a substantially higher output power than laser diodes that are merely coupled with a single-mode fiber. The laser diodes with a higher output power are much more economic to procure than laser diodes that can only be coupled with single-mode fibers. In addition, the higher output power has a positive effect on the signal produced by the fluorescent material.

The system of the invention advantageously provides that the second light source is connected to a third detector via a splitter in order to detect a reference signal of the excitation radiation. Thus, a phase shift between the excitation radiation and the main emission wavelength of the fluorescent radiation can be measured in a particularly advantageous manner, since the excitation radiation is detected through the third detector as a reference signal.

In the system of the present invention the first light source may be an ASE (Amplified Spontaneous Emission) light source, a SLED (super-luminescence electrode), a LED (Light Emitting Diode) or an EE-LED (Edge Emitting-Light Emitting Diode). The second light source may be an ASE light source, a SLED, a LED or a laser diode adapted to be coupled with a multi-mode fiber, for instance.

Such light sources have proven particularly advantageous for the generation of light to illuminate the fiber Bragg grating and for the generation of the excitation radiation.

According to one embodiment of the present system, the first light source, the second light source, the first detector and/or the second detector are connected to the sensor via at least one coupler, preferably a wavelength-dependent coupler (Wavelength Division Multiplexer). A wavelength-dependent coupler advantageously allows to direct the light from both light sources into the sensor or to direct the fluorescent radiation and the reflected light from the sensor to the respective detectors.

It may also be provided with respect to the present sensors, the present method and a present system using a plurality of fiber Bragg gratings that the fiber Bragg gratings have different grating periods so that, although the expansion is the same, the peak wavelengths of the light reflected from the fiber Bragg gratings differ from each other and can thus be discriminated. Thereby, it becomes possible to differentiate between the signals from the different fiber Bragg gratings and to evaluate them individually in a simple manner.

BRIEF DESCRIPTION OF THE DRAWINGS

A full and enabling disclosure of the present invention including the best mode thereof, enabling one of ordinary skill in the art to carry out the invention, is set forth in greater detail in the following description, including reference to the accompanying drawing in which.

DESCRIPTION OF PREFERRED EMBODIMENTS

Figure 1:
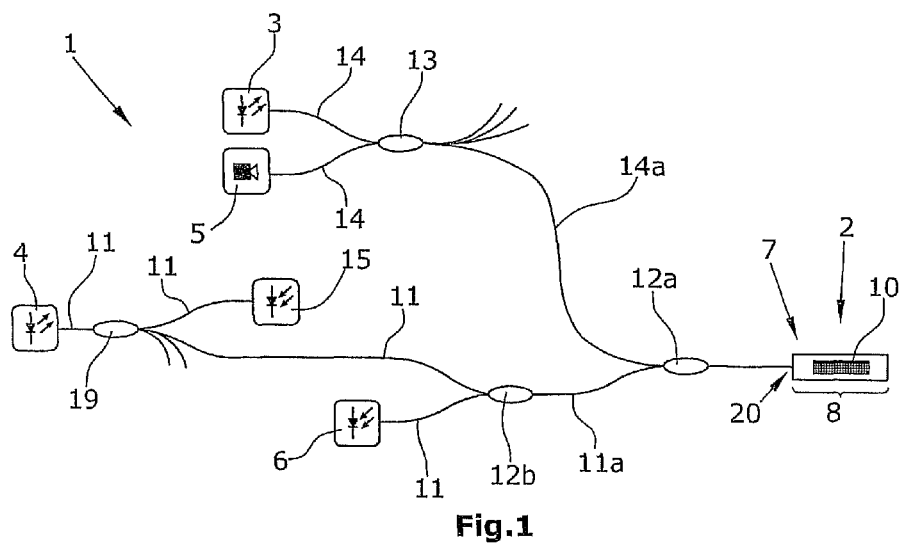
FIG. 1 is a schematic illustration of the present system for measuring forces and/or moments on an object.

FIG. 1 is a schematic illustration of the present system 1 for measuring forces and/or moments on an object. The object is not illustrated in the Figure.

The system 1 of the present invention comprises at least one sensor 2, a first light source 3, a second light source 4, a first detector 5 and a second detector 6.

Figure 2:
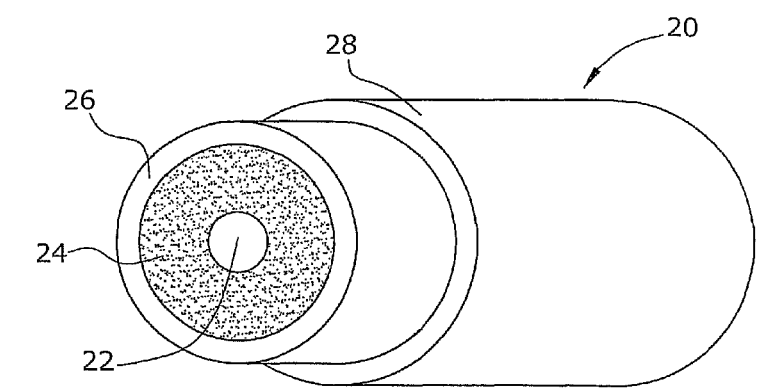
FIG. 2 is a schematic illustration of the structure of an optical fiber used in a sensor element of a sensor according to the invention.

The sensor 2 is formed by an optical fiber 20 comprising a sensor region 8. A fiber Bragg grating 10 is arranged in this sensor region 8. In the sensor region 8, the optical fiber 20 is doped with a fluorescent material not illustrated in the Figure. The exact structure of the optical fiber is illustrated in FIG. 2.

The first light source 3 and the second light source 4 are connected to the sensor 2 via optical fibers 11, 11a, 14, 14a and coupler elements 12a, 12b. The first detector 5 and the second detector 6 are also connected to the sensor 2 through optical fibers 11, 11a, 14, 14a.

The first light source 3 preferably generates a broadband light directed into the sensor 2 via the optical fibers 14, 14a and the first coupler 12a. In the sensor, the light is reflected by the fiber Bragg grating 10. The reflected light has a peak wavelength. The reflected light is directed to the first detector 5 via the optical fiber 14, 14a and the first coupler 12a, which detector detects the reflected light and, optionally, the spectrum of the reflected light, from which the peak wavelength can be derived. The first detector 5 may be a spectrometer, for instance.

When the object, not illustrated in FIG. 1, and thereby the sensor 2 on the object is expanded, a reflected light with another peak wavelength is reflected so that one can conclude on the expansion of the sensor 2 and thus on the expansion of the object from the change in the peak wavelength. However, the expansion of the object is caused by forces and/or moments influencing the object and by temperature influences on the object. Further, the sensor 2 is also influenced by the temperature, since the thermo-optical coefficient of the optical fiber can change.

In order to compensate for the temperature influences, the second light source 4 directs an excitation radiation for the fluorescent material to the sensor 2 via the optical fibers 11, 11a, the second coupler 12b and the first coupler 12a. The excitation radiation excites the fluorescent material to fluorescent radiation and the fluorescent radiation is directed to the second detector 6 via the optical fibers 11, 11a, the first coupler 12a and the second coupler 12b. The second detector 6 detects the fluorescent radiation and a main emission wavelength of the fluorescent radiation. The excitation radiation is split by the second light source 4 by means of a splitter 14 and directed to a third detector 15 which detects a reference signal of the excitation radiation. By comparing the reference signal of the excitation radiation with the main emission wavelength of the fluorescent radiation, a phase shift and thus the fluorescence lifetime of the fluorescent light can be calculated. The fluorescence lifetime is a measure of the expansion of the sensor element and the temperature of the sensor element and thus allows conclusions on the temperature of the object. Using the measured values of the peak wavelength of the reflected light from the fiber Bragg grating and the phase shift between the fluorescent radiation and the excitation radiation, the temperature of the sensor element and thus of the object can be determined, whereby the expansion of the object can be calculated with a compensation of the temperature influences. This expansion then allows a determination of the force exerted on the object or the moment exerted on the object.

The broadband light of the first light source 3 can be directed through a splitter 13 splitting the light so that the light can be directed into a plurality of sensor elements 7 or sensors 2, as is schematically indicated.

The second splitter 19 may also split the excitation radiation of the second light source 4 further so that the excitation radiation can also be directed into further sensor elements 7 or sensors 2.

The first and the second coupler 12a, 12b may be wavelength-dependent couplers (Wavelength Division Multiplexers).

In the sensor according to the invention, the fluorescent material can be selected such that the excitation radiation and the main emission wavelength of the fluorescent radiation are in one wavelength range that differs from the wavelength range comprising the peak wavelengths of the fiber Bragg grating as a function of the expansion. Thereby, a clear discrimination of the individual signals is possible, e.g. through the coupler 12a.

The sensor 2 of the invention may comprise a plurality of sensor elements 7. Here, it would be advantageous if the fiber Bragg gratings 10 of the individual sensor elements 7 had different grating periods, so that, given the same expansion, the individual fiber Bragg gratings 10 respectively generate a reflected light having different peak wavelengths. In this manner, a plurality of fiber Bragg gratings can be irradiated with the same light source 3, while it is still possible to obtain a good evaluation of the light reflected from the plurality of fiber Bragg gratings 10. In particular, it is possible to arrange a plurality of sensor elements 7 of the sensor 2 in a single optical fiber.

FIG. 2 schematically illustrates an optical fiber 20 used for a sensor element 7 of the invention. The optical fiber is formed by a fiber core 22 in which the fiber Bragg grating is provided. The fiber Bragg grating is not illustrated in FIG. 2. The fiber core 22 is surrounded by a sheath 24 of light-guiding material. The light-guiding material of the sheath 24 is doped with the fluorescent material. Further, the optical fiber may comprise a second sheath 26 arranged around the sheath 24 with the fluorescent material. The second sheath 26 guarantees that the radiation introduced into the sheath 24 and the fluorescent radiation generated will remain in the sheath 24 or be passed through the same. Finally, a protective coating 28 can be provided that encloses the entire optical fiber 20 and provides protection against environmental influences.

The layered structure of the optical fiber 20 has the advantage that the volume of the region of light-guiding material doped with fluorescent material is much larger when compared to conventionally used single-mode fibers so that the fluorescent radiation generated by the fluorescent material is much stronger. Thus, the sensor elements 7 can be made very short and therefore very small without the risk of the fluorescent material signal being useless.

The fiber core 22 may, for instance, have a diameter between 4 and 11 µm. The diameter of the sheath 24 may be between 80 and 125 µm, preferably 105 µm.

Figure 3:
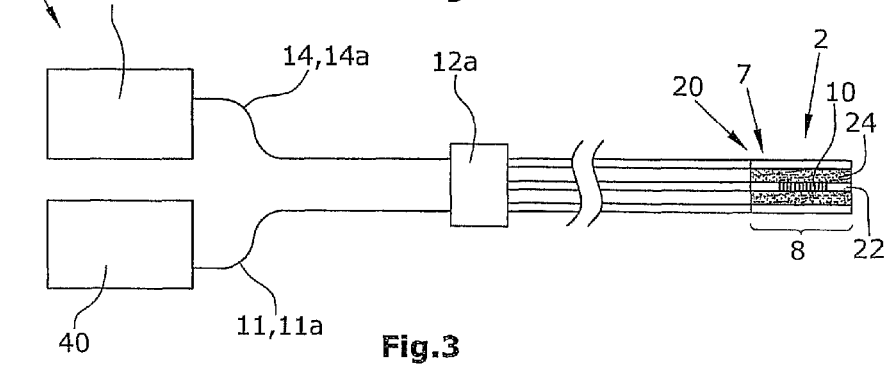
FIG. 3 is a schematic illustration of the general structure of the present system with a sensor according to the invention.

FIG. 3 schematically illustrates the system 1 of the invention for the purpose of explaining the different supply to the fiber core 22 with the fiber Bragg grating 10 and to the sheath 24. In FIG. 3, which is a schematic illustration of the system 1 according to the invention, the light source 3 as well as the first detector 5 and the splitter 13 are combined as a measuring system 30 for the evaluation of the fiber Bragg grating. The light source 4, the second detector 6, the splitter 14 and the second coupler 12b are combined into a measuring system 40 for measuring the fluorescence lifetime.

The two measuring systems 30, 40 are connected to the first coupler 12a through the optical fibers 11, 11a, 14, 14a. Coupled to the first coupler 12a is an optical fiber formed by the optical fiber 20 illustrated in FIG. 2, which has at least a fiber core 22 with the fiber Bragg grating, as well as a sheath 24 surrounding the fiber core 22. The sheath 24 is doped with fluorescent material. The optical fiber 20 forms the sensor element 7 of the sensor 2. The coupler 12a directs the broadband light of the measuring system 30 into the fiber core 22, while the excitation radiation of the measuring system 40 is directed into the sheath 24. The optical fibers 11, 11a may be multi-mode fibers. Therefore, the second light source 4 can be a laser diode that is adapted to be coupled to a multi-mode fiber and therefore has a much higher output power than a laser diode merely adapted to be coupled to a single-mode fiber.

The optical fibers 14, 14a are designed as single-mode fibers. Due to the multi-layered structure of the optical fiber 20, the signals produced by the fiber Bragg grating 10 and the fluorescent material of the sheath 24 can be transmitted separately so that it is not absolutely necessary that the main emission wavelengths of the fluorescent radiation clearly differ from the wavelength range of the peak wavelength of the light reflected by the fiber Bragg grating. Accordingly, a plurality of fluorescent materials can be used.

It should be understood that the fiber core 22 could also be doped with a fluorescent material, whereby the amount of fluorescent material in the optical fiber 20 is increased and the signal quality is thereby enhanced. In such an embodiment, it is of course necessary that the main emission wavelengths of the fluorescent radiation differ from the peak wavelengths of the fiber Bragg grating.

It is also possible that the fiber core 22 is doped with a material that differs from the doping material of the sheath 24. If the amount of fluorescent material in the fiber core 22 is sufficiently large, two different fluorescent radiations can be produced by means of the sensor element 7 of the invention so that a further signal could be available for evaluation.

It may also be provided that, if a plurality of sensor elements 7 are used, different fluorescent materials is provided which respectively dope the optical fibers in the sensor regions 8. Due to the different fluorescent material, different excitation radiations and different main emission wavelengths of the fluorescent light can be obtained, so that the individual sensor elements can be clearly discriminated when it comes to evaluation.

In this manner it is possible, for example, to use the second detector 6 for a plurality of measuring points.

The first light source may, for instance, be an ASE (Amplified Spontaneous Emission) light source, a SLED (super-luminescence electrode), a LED (Light Emitting Diode) or an EE-LED (Edge Emitting-Light Emitting Diode). The second light source may be an ASE light source, a SLED, a LED or a laser diode adapted to be coupled with a multi-mode fiber, for instance.

It is further possible that the determination of the fluorescence lifetime is effected through a pulse-like or rectangular excitation of the fluorescence and a subsequent measuring of the intensity, e.g. by determining the decay time of the intensity.

The fluorescent material may be a rare earth metal, such as ytterbium or erbium.

The second light source may also be a modulated ASE source, a modulated super-luminescence diode or a modulated LED. The excitation radiation may also be depolarized by a depolarizer in order to minimize polarization effects. The third detector 15 may also be a photodiode arranged directly in the second light source 4. For the purpose of calculating the phase shift, it is further possible to obtain the reference signal from the second light source 4 by means of a control signal.

A plurality of third detectors can be provided that measure the fluorescent radiation for each measuring point.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A sensor for measuring forces and moments on an object, comprising:
 at least one sensor element for the detection of an expansion of the object in at least one spatial direction, from which expansion of a force or a moment can be determined,
 wherein the sensor element comprises an optical fiber with a sensor region in which a fiber Bragg grating is provided, and said fiber Bragg grating is adapted to be irradiated with light for generating a reflected light having a peak wavelength,
 wherein the optical fiber is formed by a fiber core and at least one sheath of light-guiding material surrounding the fiber core, and the fiber Bragg grating is arranged in the fiber core, wherein the material of the sheath is doped with a fluorescent material and the fluorescent material is adapted to be irradiated with an excitation radiation to generate a fluorescent radiation having at least one main emission wavelength.

2. The sensor of claim 1, wherein the fiber core material is doped with a fluorescent material, the fluorescent material of the fiber core having an excitation radiation and a fluorescent radiation with main emission wavelengths in wavelength ranges that differ from the wavelength range of the peak wavelength of the light reflected from the fiber Bragg grating.

3. The sensor of claim 2, wherein the fiber core material and the sheath are doped with the same fluorescent material.

4. The sensor of claim 1, wherein the fluorescent material is a rare earth metal.

5. The sensor of claim 4, wherein the rare earth metal is at least one of ytterbium and erbium.

6. The sensor of claim 1, wherein the fiber core has polarization-maintaining properties and each sensor element detects the object expansion in two spatial directions, the object expansion in the two spatial directions being detectable via the fast axis of the polarization-maintaining fiber core and the slow axis of the polarization-maintaining fiber core.

7. The sensor of claim 6, wherein the fiber core is a birefringent fiber.

8. The sensor of claim 1, wherein a plurality of sensor elements, wherein the sensor elements detect six expansions of the object in three spatial directions, respectively, to determine forces and moments.

9. The sensor of claim 1, wherein the fiber core has a diameter between about 4 and 11 μm and that the sheath surrounding the fiber core has a diameter between about 80 and 125 μm.

10. The sensor of claim 9, wherein the sheath surrounding the fiber core has a diameter of 105 μm.

11. The sensor of claim 1, wherein the light is a broadband light.

* * * * *